United States Patent [19]

Etchell

[11] Patent Number: 5,167,077

[45] Date of Patent: Dec. 1, 1992

[54] LINEAR MEASURING DEVICE

[76] Inventor: Howard Etchell, 9090 Brandywine Road, Sagamore Hills, Ohio 44067

[21] Appl. No.: 692,278

[22] Filed: Apr. 26, 1991

[51] Int. Cl.$^5$ .............................................. G01B 7/02
[52] U.S. Cl. ...................................... 33/783; 33/803;
33/784; 33/501.06
[58] Field of Search ................. 33/783, 784, 803, 810,
33/811, 812, 806, 549, 555, 555.1, 545, 501.05,
501.06

[56] References Cited

U.S. PATENT DOCUMENTS

| | | |
|---|---|---|
| 2,879,600 | 3/1959 | Sorensen .......................... 33/501.05 |
| 2,968,100 | 1/1961 | Etchell ................................. 33/803 |
| 3,197,873 | 8/1965 | Aller . |
| 3,213,542 | 10/1965 | Murtland . |
| 3,535,793 | 10/1970 | Williams et al. . |
| 3,851,396 | 12/1974 | Klabunde . |
| 4,063,362 | 12/1977 | Amsbury et al. . |
| 4,096,384 | 6/1978 | Sartorio et al. . |
| 4,136,455 | 1/1979 | Owsen . |
| 4,216,584 | 8/1980 | Meissner et al. . |
| 4,525,931 | 7/1985 | Wilkins . |
| 4,567,663 | 2/1986 | Gillespie . |
| 4,700,485 | 10/1987 | Caulfield . |

OTHER PUBLICATIONS

Tri-Chek 900 Comparator, one page advertisement.
Digital Readouts, RSF Electronik, one page advertisement.
Tri-Check 900 Comparator: Author: Fairlane Tool, Inc. (one page).
RSF Elektronik Digital Readouts: Author: RSF Elektronik Gesellschaft mbH Rieder & Schwaiger (One page).
ERL Gaging Systems Brochure: Author: ERL Gaging Systems (4 pages).
RSF Elektronik Incremental Linear Scales: Author: RSF-Elektronik Gesellschaft mbH Rieder & Schwaiger (4 pages).
Fowler Trimos Horizontal Setting Instruments: Author: Fowler pp. 354 through 359.
ERL Electromechanical Research Laboratories Inc. "Quick Length" New Dimensions in Gaging, 6 page product brochure, Jan. 1989.
ERL Gaging Supergage Inspection Station, SSH-001 Horizontal Model 4 page product brochure.
HK Precision Technology Division, Modular Measuring System M, 5 pages, 1989 Incremental Linear Scales MSA 001, RSF Electronik brochure.
Fowler Trimos Horizontal Setting Instruments, product ads for various products of Fowler, pp. 354-359.
Photographs of Bowen Manufacturing Measuring Device.

Primary Examiner—Harry N. Haroian
Attorney, Agent, or Firm—Halter & Griswold Calfee

[57] ABSTRACT

A device for measuring a linear dimension of a component includes a shaft, a worktable base for supporting one end of the shaft, and an end plate for supporting the other end of the shaft in spaced relation to a surface of the worktable. The device also includes a saddle movable along the shaft between the worktable base and the end plate. The worktable base includes a first support table, and the saddle includes a second support table, co-planar with the first support table. Each support table has a removable measuring pin extending upwardly at an angle substantially normal to the surface of the table. The support tables have a configuration designed to support at least a portion of the component in engagement with a respective measuring pin over a wide range of pin separations. A linear scale measures the linear displacement of the measuring pins and provides an indication of the linear dimension of the component.

25 Claims, 8 Drawing Sheets

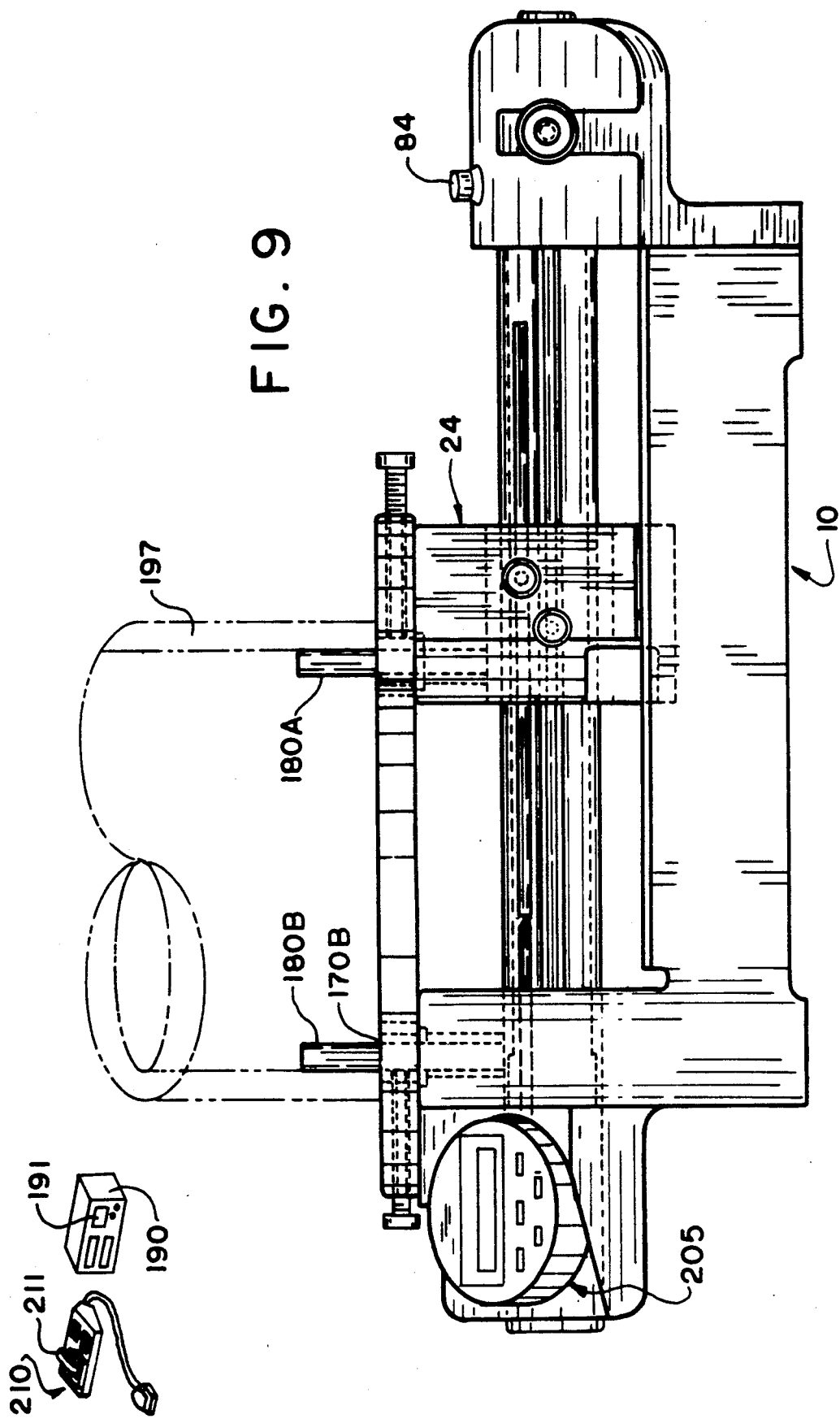

LINEAR MEASURING DEVICE

TECHNICAL FIELD

The present invention relates to a linear measuring device for measuring a linear dimension of a component.

BACKGROUND

It is sometimes necessary to measure components such as rods, pipes and gears. In some instances, these components must be measured to a high degree to accuracy in order to conform to detailed specifications and/or manufacturing tolerances. Typically, these components are measured both during and after the manufacturing process to assure that this accuracy has been achieved.

For example, to determine if a component conforms to particular specifications and/or tolerances, certain dimensions of the component, e.g., the inner and outer diameter, the length, the pitch diameter of gears and/or the distance between selected apertures on the component are measured. To perform these and other measurements, typically a caliper or micrometer is manually supported over the component and adjusted to provide an indication of the selected dimension.

Alternatively, an electronic device can be used to measure the selected dimension of the component, such as shown for example in Gillespie, U.S. Pat. No. 4,567,663. The Gillespie patent shows a wheeled support having a first anvil secured to one end of a track. Components such as sheet stock, templates and panels are supported on parallel support bars on the track and a second anvil is moved along the track into engagement with the selected dimension of a component. A digital display electrically connected to an encoder generates an output indicating the displacement of the second anvil from the first anvil.

Similarly, Caulfield, U.S. Pat. No. 4,700,485, discloses a linear measuring device for measuring a push-pull cable assembly. The Caulfield device comprises a first end block which supports one end of a pair of shafts, and a second end block which supports the other end of the pair of shafts in spaced relation to a support surface. A third block mounted on the shafts is moveable between the first end block and the second end block. The cable assembly is retained between a retaining means mounted in the first end block and a retaining means mounted in the third, moveable block. The third block, having a detector head, is moved along the shafts to put the cable assembly under tension and allow measurement of the length of the cable assembly against a linear scale.

However, these measuring devices are not without drawbacks. For example, manually supporting a caliper or micrometer over a component during the measuring process can result in misreading and error. In particular, operator fatigue, vibration and movement of the component, and inadvertent movement of the caliper or micrometer can lead to incorrect results.

Moreover, Caulfield's measuring device is primarily designed to measure the length of a push-pull cable assembly by putting the cable assembly under outward tension. Caulfield's device is not designed to measure in the inward direction, such as measuring the outside diameter of a component. Moreover, Caulfield does not provide a support surface for measuring the component with the retaining means. The cable assembly is retained between the retaining means and hence is supported by the outward tension applied by the retaining means.

Similarly, the Gillespie measuring device is only adapted to measure the outer dimension of components such as elongated sheet stock, templates and panels. Gillespie's device is not adapted to measure in the outward direction, such as measuring the inside diameter of a component. Moreover, the track of the Gillespie device has a limited surface area for supporting these components during the measuring process. Although a portion of the component can be set on the support bars on the track, the track is relatively thin and is not designed to support a wide variety of components such as rods, pipes and gears. Therefore, it can be necessary to manually support the components across the support bars on the track which, as described above with respect to calipers and micrometers, can lead to incorrect results.

SUMMARY OF THE INVENTION

The present invention provides a new and useful linear measuring device for measuring a linear dimension of a component. The linear measuring devices measures both the inner and outer dimensions of a component to a high degree of accuracy. Moreover, the present invention provides a pair of support tables having measuring pins designed to engage a selected dimension of the component. The component is supported in engagement with the measuring pins over a wide range of pin separations.

According to one aspect of the invention, the measuring device includes a shaft, a worktable base for supporting one end of the shaft, and an end plate for supporting the other end of the shaft in spaced relation to a surface of the worktable. A moveable saddle is slidingly received along the shaft between the worktable base and the end plate.

A first support table is removably attached to the top surface of the worktable base, and a second support table is removably attached to the top surface of the saddle, substantially co-planar with the first support table. Measuring pins are adapted to be removably mounted in a bore formed in each of the first and second support tables. Each measuring pin is mounted at an angle substantially normal to the surface of a respective support table.

A linear scale is mounted to and extends along the worktable. The linear scale is adapted to be calibrated against a standard to initially provide a reference point. The linear scale measures and displays the relative displacement between the measuring pin mounted in the second support table with respect to reference point on the scale.

One useful feature of the invention is to provide a multi-purpose linear measuring device which measures the inner and outer dimensions of components to a high degree of accuracy. In particular, the measuring pins are located substantially adjacent opposite edges on the support tables and can accurately measure from relatively small to relatively large inner and outer dimensions of components.

Still further, another useful feature is that the measuring pins on the measuring device can be removed from the support tables and measuring pins having different dimensions, e.g., different diameters, lengths, configurations, etc., can be easily mounted on the support tables depending on the size and weight of the components and the dimensions to be measured.

Additionally, another useful feature of the invention is to provide a linear measuring device having a pair of support tables, wherein each support table is configured to support at least a portion of a component in engagement with the measuring pins. The component can be located either over or between the measuring pins, and the tables can be appropriately moved to provide support for the component over a wide range of pin separations. This feature particularly facilitates measuring a wide range of components having different inner and outer dimensions.

Further, another useful feature of the invention is that the linear scale can be calibrated using a single standard. In particular, the linear scale provides an indication of the relative linear displacement between the measuring pin on the second support table and a selected reference point along the scale. After calibration, the scale can measure components of varying dimensions without further calibration.

Further features and advantages of the present invention will become apparent from the following detailed description and accompanying drawings which form a part of the specification.

BRIEF DESCRIPTION OF THE DRAWINGS

FIG. 9 is a perspective view of the linear measuring device of FIG. 1, illustrating a component supported by the support tables and having an inner dimension engaged by the measuring pins.

DETAILED DESCRIPTION OF THE PREFERRED EMBODIMENT

Figure 1:
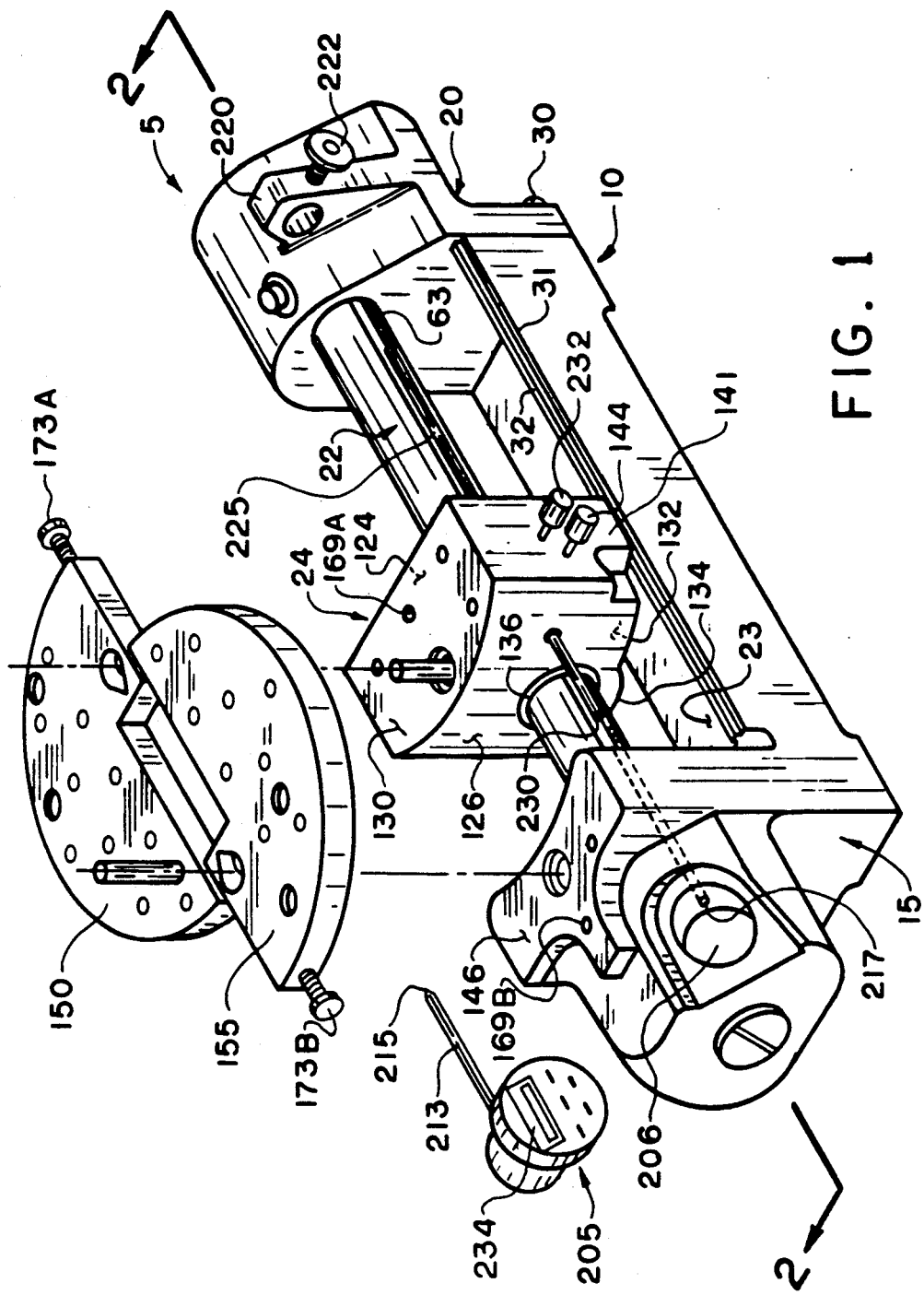
FIG. 1 is a perspective, partially exploded view of various components of a linear measuring device constructed in accordance with the present invention.

Referring to the drawings, and initially to FIG. 1, a linear measuring device, indicated generally at 5, provides support for a component (not shown) during the measuring process. The linear measuring device is adapted to measure substantially all of the useful dimensions of the component, e.g., the inner and outer diameter, the distance between apertures, aperture sizes, the pitch diameter of gears, lengths, depths, widths and roundness. Moreover, additional measuring capabilities, such as the depth of key-ways and shaft run-out, are also within the scope of this invention.

The linear measurement device 5 includes a worktable, indicated generally at 10, a base, indicated generally at 15, and an end plate, indicated generally at 20. A shaft, indicated generally at 22, extends between the worktable base 15 and the end plate 20 in spaced relation to the surface 23 of the worktable 10. Additionally, a saddle, indicated generally at 24, is slidingly received along the shaft 22 and is designed to move between the base 15 and end plate 20.

The worktable 10, base 15, and end plate 20 are preferably formed out of cast iron or other appropriate material and provide a stable and substantially vibration-free working environment for measuring a selected dimension of the component. The worktable 10 and worktable base 15 are formed integrally with each other during the casting process, while the end plate 20 is formed separately and attached to the end of the worktable 10 using bolts 30 or other conventional fasteners.

The linear measuring device 5 also includes a pair of rails formed integrally with the worktable 10, one of which is shown at 31 in FIG. 1. The rails 31 extend longitudinally along the sides of the worktable 10, and project upwardly from surface 23. Each rail include a top surface 32 which is adapted to support and guide the saddle 24 along the length of the shaft 22, as described herein in more detail.

Figure 2:
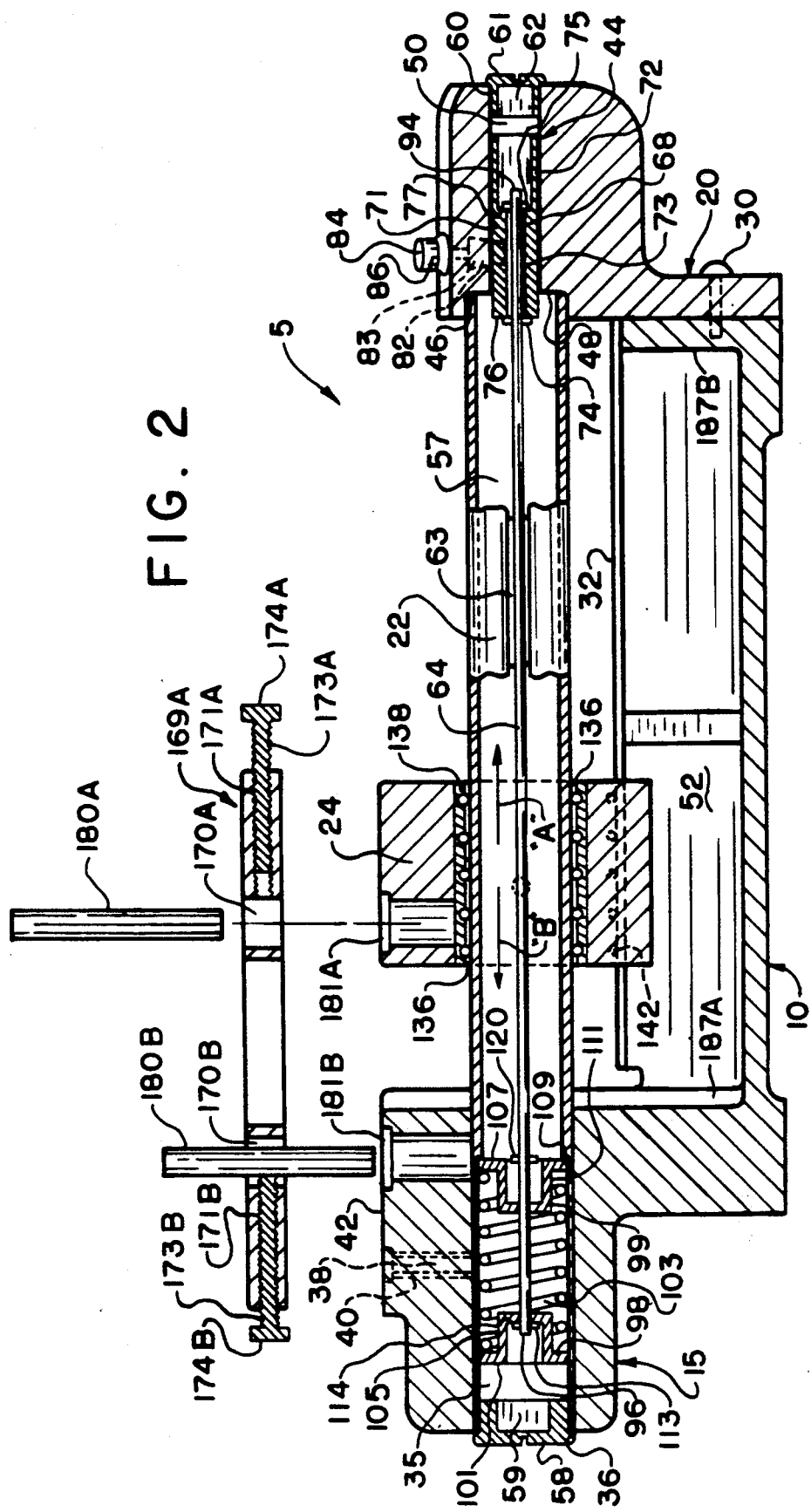
FIG. 2 is a cross-sectional, partially exploded side view of various components of the linear measuring device taken substantially along the plane described by the lines 2—2 of FIG. 1, and illustrating the saddle moving in one direction.

Referring now to FIG. 2, the worktable base 15 includes a central bore 35 extending horizontally therethrough and adapted to receive one end 36 of the shaft 22. The shaft 22 is secured within the bore 35 with conventional fasteners 38, e.g., screws or bolts, inserted downwardly through threaded bores 40 in the top surface 42 of the worktable base 15.

The end plate 20 includes a corresponding central bore, indicated generally at 44, extending horizontally therethrough and adapted to receive the other end 46 of the shaft 22. The central bore 44 in the end plate 20 includes a shoulder portion 48 which narrows down to a thinner, necked portion 50. The end 46 of shaft 22 is received within the bore 44 and abuts the shoulder portion 48 in the bore 44. The shaft 22 is thereby secured between bores 35 and 44 by shoulder portion 48 and fasteners 38.

The shaft 22 is formed from aluminum or other appropriate material and comprises a longitudinally extending, tubular-shaped member having an inner bore 57. The first end 36 of the shaft 22 has a threaded inner surface which is adapted to receive a first threaded end cap 58. The first end cap 58 includes a central, inner aperture 59 formed therein. The second end 60 of bore 44 also has a threaded inner surface, and is adapted to receive a second threaded end cap 61. The end cap 61 also includes a central inner aperture 62 formed therein.

The shaft 22 includes a longitudinally extending slit 63, which is formed along the length of the shaft between base 15 and end plate 20. The slit 63 allows access to an operating rod 64 extending longitudinally within the inner bore 57 of shaft 22. The saddle 24 can be selectively attached and detached from rod 64 to provide the saddle 24 with selected linear movement relative to the shaft 22. To this end, a concentrically extending rack 68 is partially received within end 46 of shaft 22. The rack 68 comprises a hollow, tubular-shaped member having a body 71 and an outwardly-extending sleeved portion 72. The body 71 and sleeved portion 72 extend partially into the necked portion 50 of end plate bore 44.

The body 71 of the rack 68 includes a centrally-formed aperture 73 which is adapted to receive the operating rod 64 therein. In particular, the rod 64 extends through the aperture 73 and partially into the hollow, sleeved portion 72 of the rack 68. The operating rod 64 is secured within the aperture by a pair of retaining rings 74, 75, which contact the outer end surface 76 and inner end surface 77, respectively, of the body 71. The retaining rings 74, 75 are conventional in design and may, for example, comprise washers or cotter pins.

The rack 68 is adapted to reciprocate within the central bore 44. To this end, a bore 82 extends downwardly through the end plate 20 and tangentially opens into the necked portion 50 of the central bore 44. A gear 83, having longitudinally extending gear teeth (not shown), is located within bore 82 and extends partially into the necked portion 50. The gear teeth on gear 83 are adapted to engage corresponding gear teeth on the rack 68 to provide selected linear displacement of rack 68.

A gear knob 84 is attached to the outer end of gear 83 and allows manual rotation of the gear 83, and hence selected linear movement of rack 68 within the central bore 44. When the rack 68 is moved forwardly or rearwardly, i.e., in the directions indicated generally by the arrows "A" or "B" respectively in FIG. 2, the first and second retaining rings 74, 75 engage a respective end surface 76, 77 of the rack 68 to simultaneously move the operating rod 64 linearly within the shaft 22. Accordingly, rotation of the gear knob 84 in either the clockwise direction (see e.g., FIG. 2) or counterclockwise direction (see e.g., FIG. 3) is adapted to move the rack 68, and hence the operating rod 64, either forwardly or rearwardly within the bore 65 of the shaft 22. Indexing information 86 on the gear knob 84 and on the upper surface of the end plate (not shown) indicates the relative linear displacement of the rack 68 during rotation of the knob 84.

The other end 96 of the operating rod 64 is received through apertures (unnumbered) formed in a first spring retainer cup 98 and a second spring retainer cup 99. In particular, the first spring retainer cup 98 is located toward the first end 36 of the shaft 22 and has an outer flange 101 which normally abuts the end cap 58 (see e.g., FIG. 3). One end of a spring 103 extends around the sides 105 of the first retainer cup 98 and engages the flange 101.

The second spring retainer cup 99 also includes an outer flange 107 which is adapted to engage an inner shoulder 109 of the shaft 22. The other end of spring 103 extends around the sides 111 of the second retainer cup 99 and engages flange 107. Accordingly, the spring 103 extends between the first retainer cup 98 and the second retainer cup 99. A slight bias is applied outwardly against cups 98, 99 by locating the first and second spring retainer cups 98, 99 slightly closer than the natural extension length of the spring 103.

A third retaining ring 113 is attached at the end 96 of operating rod 64 and is adapted to engage the bottom 114 of the first retainer cup 98. A fourth retaining ring 120 is similarly attached to rod 64 at a location spaced from the end 96, and is adapted to engage the bottom 122 of the second retainer cup 99 (see e.g., FIG. 3). The third and fourth retaining rings 113, 120, cooperate to restrict the movement of rod 64 within the retainer cups 98, 99.

In particular, in the initial equilibrium position, the spring 103 acts to bias the spring retainer cups 98, 99 outwardly against both the end cap 58 and the shoulder portion 109 of the shaft 22, while the retainer rings 113, 114 limit the outward movement of the cups 98, 99 along the operating rod 64. When the rod 64 is moved forwardly or rearwardly within the shaft 22, a spring bias is applied to a respective retainer cup, which, in conjunction with a respective retaining ring, acts to bias the operating rod 64 back into its initial, equilibrium position.

For example, when the rod 64 is moved forwardly within the shaft 22, as illustrated in FIG. 2, the third retaining ring 113 engages the bottom of the first retainer cup 98 and urges cup 98 against the bias of the spring 103 and away from engagement with the end cap 58. The fourth retaining ring 120 moves away from and out of engagement with the second retainer cup 99; however, second retainer cup 99 remains in engagement with the shoulder portion 109 of the shaft 22. The spring 103 is thereby put under compression by the movement of the operating rod 64 forwardly within the shaft 22.

Figure 3:
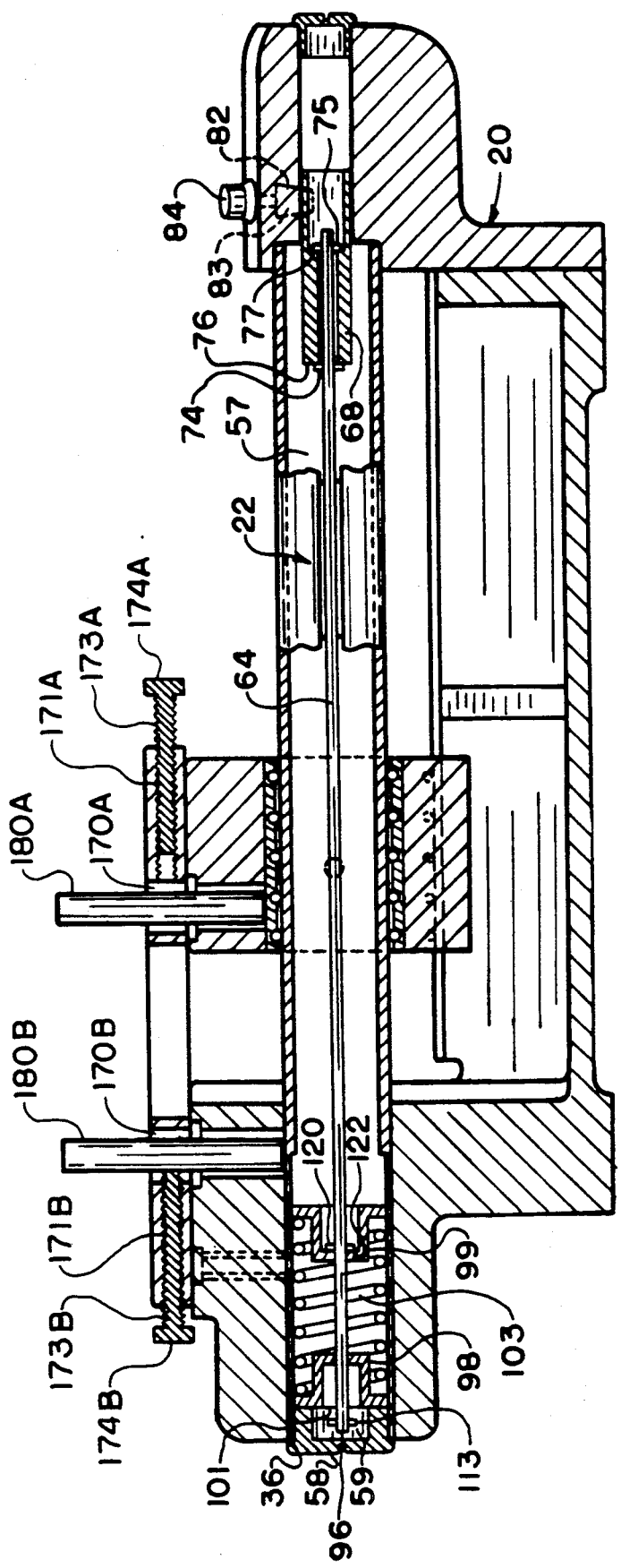
FIG. 3 is a cross sectional side view of the linear measuring device of FIG. 2, illustrating the saddle moving in an opposite direction.

Likewise, as shown in FIG. 3, when the rod 64 moves rearwardly within the shaft 22, the fourth retaining ring 120 urges the second retainer cup 99 against the bias of the spring 103. The third retaining ring 113 is moved away from and out of engagement with the first retainer cup 98; however, the cup 98 remains in engagement with the end cap 58. Consequently, the spring 103 is also put under compression by the movement of the operating rod rearwardly within the shaft 22.

Accordingly, when the gear knob 84 is rotated in the counterclockwise direction, the gear teeth on the knob 84 engage the corresponding teeth on the rack 68 to linearly displace the rack 68 in the forward direction. Movement of the rack 68 in the forward direction causes the inner end surface 77 of the rack 68 to engage the second retaining ring 75 and thereby urge the rod 64 forwardly within the shaft 22, as illustrated in FIG. 2. Moving the rod 64 forwardly within the shaft 22 causes the third retainer ring 113 to engage the bottom 114 of the first retainer cup 98 and move the first retainer cup 98 forwardly against the bias of the spring 103. Additionally, the fourth retaining ring 120 moves away from its engagement with the second retainer cup 99.

Likewise, if the knob 84 is rotated in the clockwise direction, the rack 68 moves in the rearward direction. The first retainer ring 74 engages the outer end surface 76 of the rack 68, which causes the rod to move rearwardly, as illustrated in FIG. 3. The fourth retainer ring 120 contacts the bottom 122 of the second retainer cup 99 and thereby causes the second retainer cup 99 to move against the bias of the spring 103. The third retainer ring 113 moves away from its engagement with the first retainer cup 98 as the end 96 of rod 64 moves into the aperture 59 formed in the end cap 58.

Accordingly, the retainer cups and retaining rings cooperate to selectively move the operating rod 64 within the inner bore 57 of shaft 22. Moreover, rotating the gear knob 84 acts to produce a compression force on the spring 103 which resists continued knob rotation and which acts to bias the rod 64 back to its initial, equilibrium position.

Additionally, a gear lock (not shown), comprising a conventional thumbscrew, extends downwardly through a threaded bore (not shown) in the end plate 20. The bore extends into the gear bore 82 in the end plate 20. The thumbscrew can be tightened down to engage the gear 83 and lock the gear 83 in a selected rotational orientation. Consequently, a pre-set spring bias can be provided on the operating rod 64 by rotating the gear knob 84 and then tightening the thumbscrew down against the gear 83. The pre-set bias provides more consistent measuring results with the linear measuring device, as described herein in more detail. The indicia on the gear knob 84 can be used to verify the particular pre-set bias.

Referring again to FIG. 1, the moveable saddle 24 for the linear measuring device is formed from cast iron or other suitable material and includes a substantially flat, forward side 124, and a curved, rear side 126. The saddle 24 further includes a top surface 130 and a bottom surface 132. The bottom surface 132 includes a downwardly extending semicircular portion 134, which has a bore 136 formed therein. The bore 136 extends axially through the saddle 24, and includes a bearing 138 (FIG. 2) mounted therein, for example a Super Ball Bushing Linear Bearing manufactured by Thompson Industries, Inc. Model No. Super-16-OPN-DD. The shaft 22 extends through bore 136 and moves axially on bearing 138.

The sides of saddle 24 also include bearings 142 (FIG. 2) which are designed to ride along the surface portions 32 of the worktable rails 31 to provide support and stability. The bearings are mounted on camshafts (not shown) to allow vertical adjustment of the bearings and balance the saddle 24 along the shaft 22.

The saddle 24 also includes a horizontally extending threaded bore (not numbered) adapted to receive a thumbscrew lock 144 therein. The thumbscrew lock 144 extends into the central bore 136 of the saddle 24 and is aligned with aperture 63 in shaft 22. The thumbscrew lock 144 is adapted to be tightened down within the central bore 136 to engage the operating rod 64 (FIG. 2) in the shaft 22. The thumbscrew lock 144 thereby selectively secures the saddle 24 to the operating rod 64 and thereby allows relative linear movement of saddle 24 with respect to shaft 22.

The longitudinally extending aperture 63 formed along the side of the shaft 22 allows the saddle 24 to be secured to the operating rod 64 at a pre-selected location along the length of shaft 22. When the operating rod 64 moves forwardly or rearwardly within the shaft 22, the saddle 24 moves along the shaft 22 in conjunction therewith. Accordingly, when the saddle 24 is locked to the operating rod 64, the gear knob 84 provides for selected linear movement of the saddle 24 relative to shaft 22.

Referring again to FIG. 1, both the top surface 130 of the saddle 24, and the top surface 146 of the base 15 are substantially flat in design and are adaptable to provide a support surface for a component to be measured. To this end, a first table 150 is removably secured to the top surface 130 of the saddle 24, and a second table 155 is removably secured to the top surface 146 of the base 15, as described herein in more detail.

Figures 4, 5:
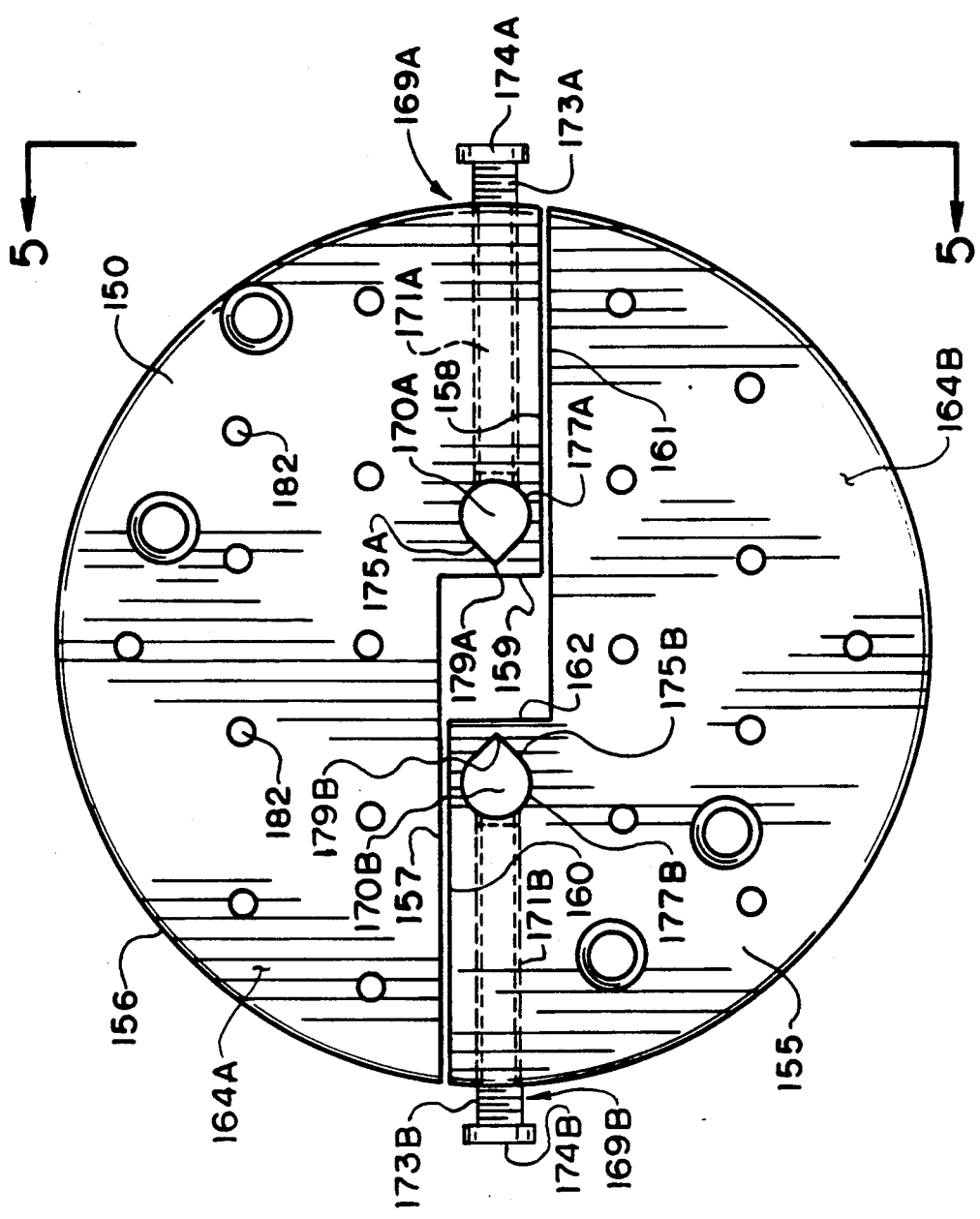
FIG. 4 is a plan view of the first and second support tables.
FIG. 5 is a side view of the first and second support tables taken substantially along the plane described by the lines 5—5 of FIG. 4.

Referring now to FIG. 4, each table 150, 155 is preferably formed from heat treated steel and may be chrome plated to provide additional abrasion resistance. Each table 150, 155 includes a semi-circular portion having an engaging side surface. For example, table 150 includes a semi-circular portion 156 and an engaging side surface consisting of a first radially extending section 157 and a second radially extending section 158. A third section 159 is substantially perpendicular to and interconnects the first and second sections 157, 158 of table 150. Table 155 is of a similar design to table 150 and has a first radially extending section 160, a second radially extending section 161, and a third section 162 interconnecting and substantially perpendicular to the first and second sections.

Figure 6:
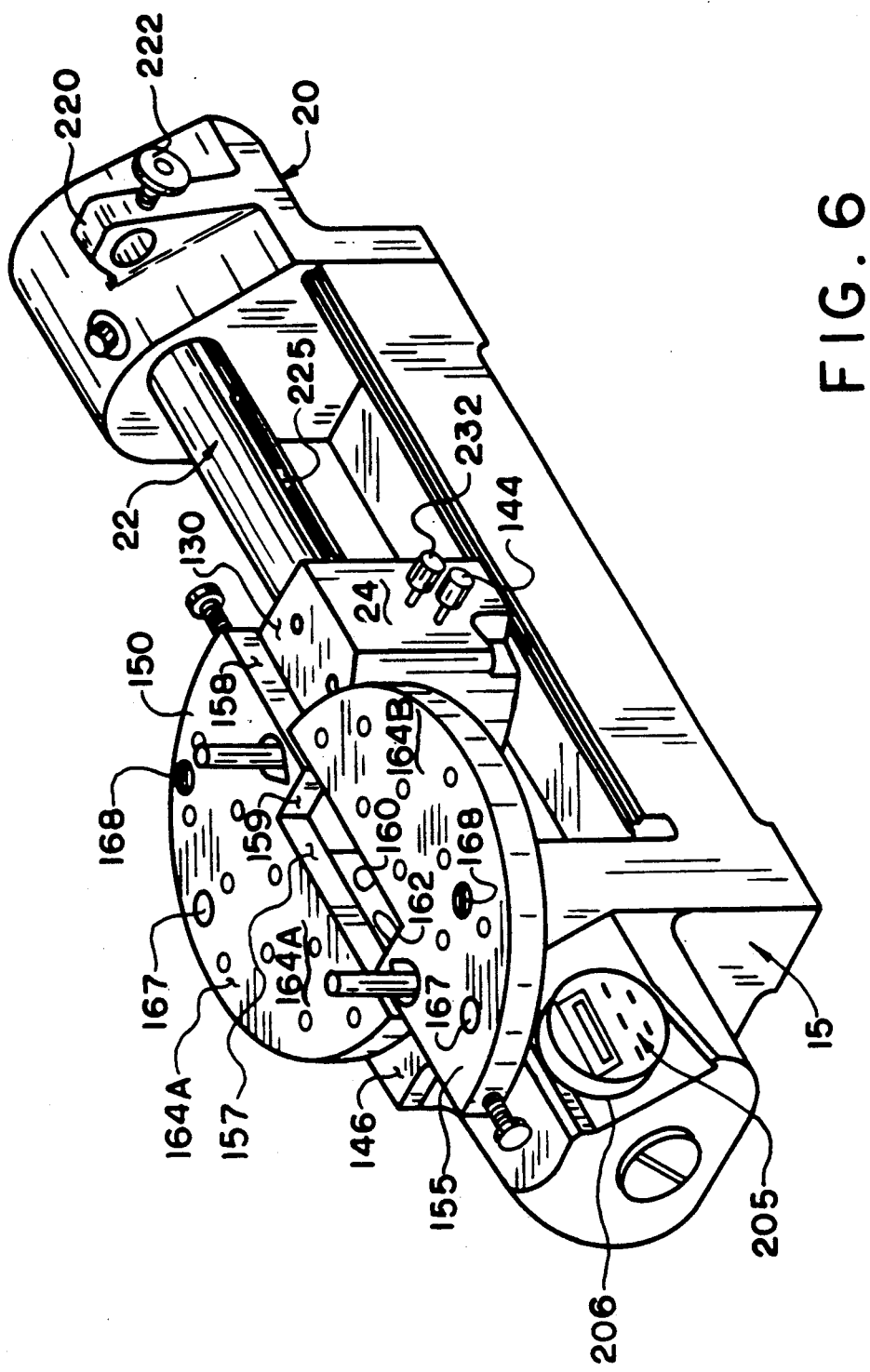
FIG. 6 is a perspective view of the linear measuring device of FIG. 1, illustrating the support tables mounted to the worktable base and the saddle.

As shown in FIG. 5, table 150 has parallel upper and lower surface 164A, 165A respectively; while table 155 has parallel upper and lower surfaces 164B, 165B, respectively. The upper and lower surfaces of tables 150, 155 include a number of threaded bores 167 extending therethrough. As shown in FIG. 6, screws 168 are inserted in bores 167 in tables 150, 155 and are received in corresponding threaded bores 169A (FIG. 1) in the saddle 24 and the bores 169B (FIG. 1) in base 15 to secure table 150 to the saddle 24 and table 155 to the worktable base 15.

Each table 150, 155 is mounted to the linear measuring device in a substantially co-planar arrangement. In particular, as shown in FIG. 5, the top surface 164A of table 150 extends substantially co-planar to the top surface 164B of table 155. Further, as shown in FIG. 4, the tables 150, 155 are mounted such that an engaging side surface of one table is substantially adjacent and movable with respect to an engaging side surface of the other table. For example, the first radially extending section 157 of the first table 150 is disposed in a substantially adjacent, edge-to-edge relationship with the first radially extending section 160 of the second table 155. Similarly, the second radially extending section 158 of table 150 is disposed in a substantially adjacent, edge-to-edge relationship with the second radially extending section 161 of the second table 155. The third sections 159, 162 of table 150, 155, respectively, are disposed adjacent each other in opposing relationship.

As shown in FIG. 4, each table 150, 155 includes a measuring pin support assembly, for example as indicated generally at 169A in table 150, and 169B in table 155. Each support assembly 169A, 169B includes a measuring pin bore 170A, 170B, respectively, extending through each table at an angle perpendicular to the surface of the respective table; and a threaded retaining screw bore 171A, 171B, respectively, extending radially inward from the periphery of each table into a respective measuring pin bore. A pair of retaining screws 173A, 173B having heads 174A, 174B are received in retaining screw bores 171A, 171B, respectively, and can be tightened down into bore 170A, 170B, respectively.

Each measuring pin bore 170A, 170B includes a conical portion 175A, 175B and an annular portion 177A, 177B, respectively. The conical portion, for example 175A, forms a wedge 179A, the point of which is located substantially adjacent the third section 159 of table 150. Similar, conical portion 175B forms a wedge 179B having a point substantially adjacent the third section 162 of table 155.

Figure 7:
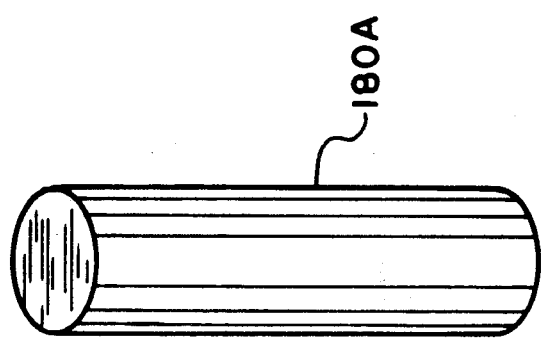
FIG. 7 is a perspective view of a measuring pin for the linear measuring device.

The measuring pin bore 170A, 170B on each table 150, 155, respectively, is adapted to at least partially receive a measuring pin therein, for example pins 180A, 180B in FIG. 2. Each measuring pin, for example pin 180A, is cylindrical in shape (see e.g., FIG. 7) and has a diameter ranging from about 87/1000" to about 375/1000", depending on the dimension and weight of the component to be measured. Each pin is preferably formed from heat-tempered steel or other appropriate material. The measuring pins 180A, 180B extend through bores 170A, 170B respectively, and can extend into a bore 181A, 181B, respectively, formed in both the saddle 24 and the base 15. For example, pin 180B can extend through bore 170B and into bore 181B formed in the work table base 15.

Each measuring pin support assembly 169A, 169B accepts measuring pin sizes up to substantially the diameter of the annular portion 177A, 177B (FIG. 4) of bores 170A, 170B, respectively. As shown in both FIGS. 2 and 3, each retaining screw can be tightened down within a respective bore against a measuring pin and force the pin against the wedge 179A, 179B (FIG. 4) to assume a perpendicular orientation with respect to the surface of each table. Accordingly, a wide variety of measuring pins can be used with the present invention depending on the size, weight and selected dimension of the component. Moreover, the outwardly projecting portion of the pins may include a knife edge, a V-groove or other functional design to facilitate measuring selected dimensions of components.

The top surface 164 of each table 150, 155 further includes a plurality of threaded bores 182 extending at least partially therethrough, as shown in FIG. 4. The threaded bores 182 can receive a plurality of stops (not shown) to facilitate positioning the component during the measuring process. Each stop is preferably pin-shaped in design and includes a threaded portion which cooperates with the threads on a respective bore to secure the stop to the table.

Figure 8:
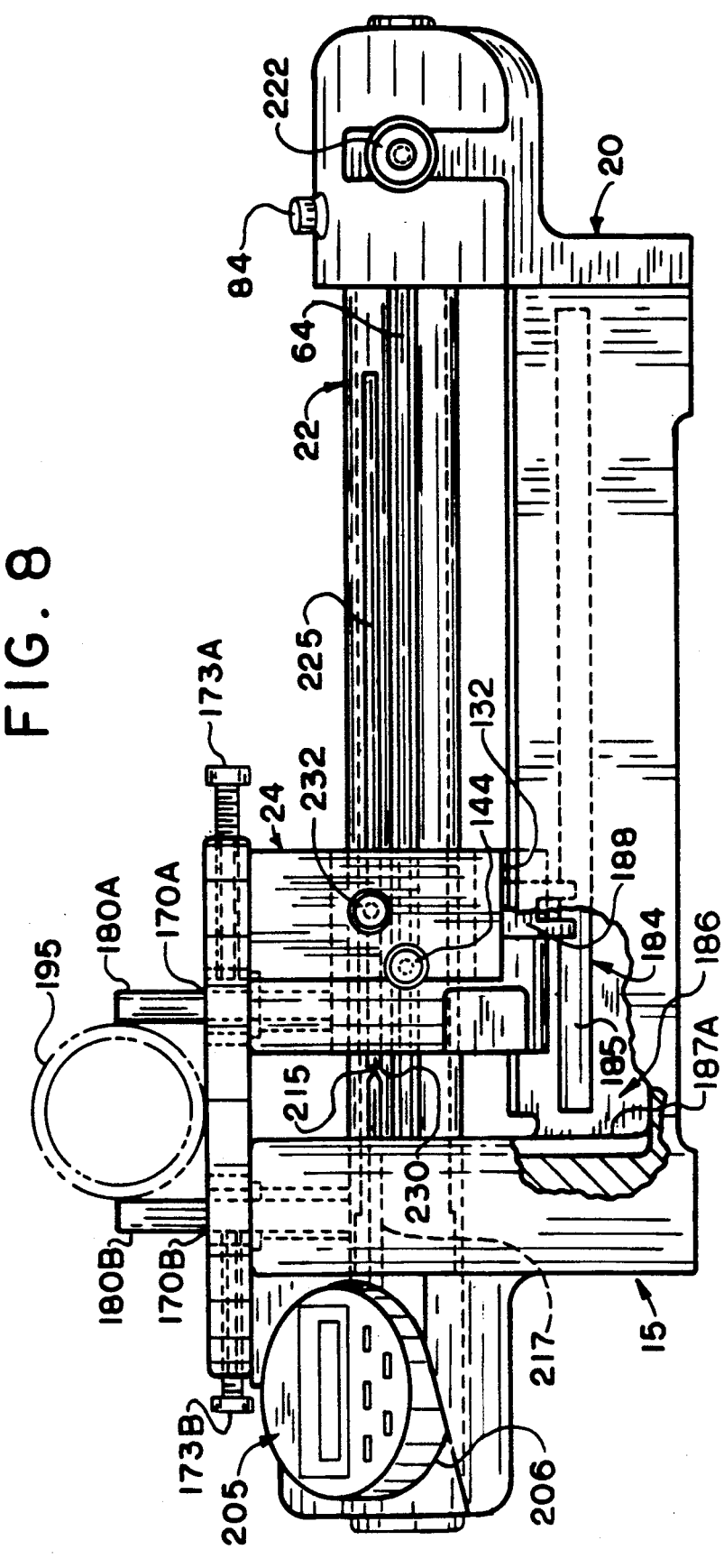
FIG. 8 is a perspective side view of the linear measuring device of FIG. 1, illustrating a component supported by the support tables and having an outer dimension engaged by the measuring pins.

To measure the relative separation between the measuring pins 180A, 180B, the linear measuring device includes a linear scale, indicated generally at 184 in FIG. 8. The linear scale 184 is preferably manufactured by Dynamics Research Corp., Model LB Modified. The linear scale 184 includes a body 185 which is mounted within a cavity, indicated generally at 186, formed in the worktable. The scale 184 extends between support member 187A and support member 187B (FIG. 2), formed by base 15 and end plate 20.

The linear scale 184 includes a reader head 188 which is mounted to the bottom surface 132 of saddle 24. The reader head 188 is adapted to move along the length of the body 185 in conjunction with the saddle 24. The linear scale 184 is electrically connected to a digital indicator 190 which provides an indication of the location of the reader head 188 along the body 184 of the linear scale on a digital display 191, as described herein in more detail. Such a digital indicator is manufactured by C-Tek, Inc., Model No. #MHC-851 modified.

The operation of the linear device is as follows. Initially, the linear device is calibrated to provide a proper indication of the relative separation between the measuring pins. This calibration is necessary in part because of the variety of different pin sizes that can be used with the linear measuring device. The digital indicator must thereby be calibrated to compensate for the relative width of each pin.

To this end, a "standard" is initially chosen to calibrate the linear measuring device. A typical standard might be a pipe 195 as shown in FIG. 8, having a 1.00 inch outside diameter. A pair of measuring pins 180A, 180B having an appropriate dimension, length, etc. are then selected, and each pin is inserted within a respective bore 170A, 170B in the tables 150, 155. The threaded retainer screw 173A, 173B in each table is tightened down against a respective pin to force the pin against the wedge into a substantially perpendicular orientation with respect to the surface of each table.

The dial 84 is then pre-loaded to a selected bias. For the 1.00 inch outside diameter pipe, the dial 84 is rotated in the counterclockwise direction to move the rod 64 forwardly within shaft 22, and the locking thumbscrew on the end plate 20 is tightened down to bear against the gear 83 and provide a pre-selected force.

The thumbscrew lock 144 on the saddle 24 is untightened, and the saddle 24 is moved relative to the operating rod 64. The pins 180A, 180B on tables 150, 155, respectively are separated at least a distance approximating the outside diameter of the standard 195. The standard 195 is then located and supported on the tables. The semicircular design and overlapping relationship of the tables provide a support surface for the standard that supports a significant portion of the standard and typically requires no additional supporting structures.

Specifically, for a wide range of pin separations, at least a portion of the two tables will be overlapping during the measuring process (see e.g., FIG. 6). This overlap enables the tables to support a wide variety of standards and/or components. Moreover, because of the location of the measuring pins on opposed portions of the tables, the tables can support a wide variety of components during measurement of either the inner and outer dimensions of these components.

In any case, the standard 195 is located between the pins on the support tables, as illustrated in FIG. 8. The saddle 24 is moved along the shaft 22 until the pins 180A, 180B contact the outer diameter of the standard 195. The thumbscrew lock 144 on the saddle 24 is then tightened, which engages the operating rod 64 extending within shaft 22, and makes the saddle 24 responsive to the movement of the gear knob 84.

After the saddle is locked to the operating rod 64, the locking thumb screw on gear 83 is released, which biases the measuring pins against the outer diameter of the standard 195 with the pre-selected force. The digital display 191 on the digital indicator 190 is then calibrated to the selected dimension of the standard 195, such as, for example, 1.00 inch for the one inch outer diameter standard. The standard 195 is then removed from the device and the linear measuring device is properly calibrated for measuring components.

To measure a selected dimension of a component, the dial 84 is again initially pre-loaded in either a clockwise or counterclockwise direction, and the thumbscrew on the end plate 20 is tightened against the gear 83. If the dimension to be measured is in the inward direction, such as the outer diameter of the component, the dial is turned counterclockwise; while if the dimension to be measured is in the outward direction, such as the inner diameter, the dial is turned clockwise. In any case, once the linear measuring device is initially calibrated, the device can measure in the inward or outward direction through any selected distance.

As an example, as shown in FIG. 9, to measure the inside diameter of a component 197, the dial 84 is rotated in the clockwise direction and the locking thumbscrew on the end plate 20 is tightened against gear 83 (FIG. 2) to provide the selected pre-set bias. The component 197 is inserted over the measuring pins 180A, 180B and allowed to rest upon the supporting tables. Again, the semi-circular design and overlapping relationship of the support tables 150, 155 cooperate to support the component over a wide range of pin separations.

The thumb screw lock 144 on the saddle 24 is then untightened and the saddle 24 is moved linearly outward into contact with the inside diameter of the component. The thumbscrew lock 144 on the saddle 24 is then tightened to engage the rod 64 extending through the shaft 22, thereby making the saddle 24 responsive to the movement of the dial 84. The thumbscrew lock on the gear 83 is released, which applies the pre-set outward bias on the measuring pins 180A, 180B against the inside diameter of the component.

If the digital display was initially calibrated to the true dimension of the standard, then the display 191 will provide an indication of the true dimension of the component. Alternatively, if the digital display was calibrated to zero, or some other relative dimension, then the digital display will display the difference in dimension between the standard and the component. Moreover, the digital display can subsequently be calibrated to the dimension of the component being measured, if desired.

According to a second aspect of the invention, as shown in FIG. 1, a digital dial indicator, indicated generally at 205, can be used with the measuring device instead of the linear scale as described previously. The dial indicator 205 is preferably manufactured by Mitutoyo, under the Model No. 543-180. The dial indicator 205 is received within a holder 206 and operates in conjunction with a portable data processor, for example as shown generally at 210 in FIGS. 8 and 9. The data processor 210 is preferably manufactured by Mitutoyo, Model #DP-IDX. The processor 210 collects the data from the digital dial indicator 205 and displays the collected data on a conventional tape roll 211.

As shown in FIG. 1, the dial indicator 205 includes a sleeve 213 extending outwardly therefrom enclosing a probe 215. The dial indicator 205 is adapted to be positioned within the indicator holder 206 (see e.g., FIGS. 8, 9) and have the sleeved probe 215 extend through a horizontal bore 217 formed in the worktable base 15. Alternatively, the dial indicator 205 can be mounted on the end plate 20 using an indicator brace 220 and a hold-down screw 222. In either case, the probe 215 would extend inwardly toward the saddle 24.

The dial indicator 205 and data processor 210 (FIG. 8) provide an indication of the relative dimensions of components. To this end, the digital dial indicator 205 is mounted to the worktable base such that the indicator probe 215 extends substantially parallel to the movement of the saddle 24 along the shaft 22 and is adapted to engage an adjustable saddle rod 225.

The saddle rod 225 extends within a horizontally extending bore (not numbered) formed within the saddle 24 at an angle substantially parallel to the direction of travel. One end 230 of the saddle rod 225 is adapted to engage the indicator probe 215 on the dial indicator 205 during movement of the saddle 24 along the shaft 22. The position of the saddle rod 225 within the saddle is adjustable, and the rod can be secured at a selected position by a saddle rod lock 232 tightened down against the saddle rod.

During initial calibration of the linear measurement device, the saddle is moved linearly until the measuring pins contact the selected dimension of the standard (see e.g., FIG. 8). The saddle rod lock 232 is then untightened, and the saddle rod 225 is moved relative to the saddle 24 until the end 230 of the saddle rod 225 contacts the indicator probe 205. The dial indicator 205 and data processor 210 are then calibrated to indicate the true dimension of the standard, or alternatively set to zero if a deviation measurement is to be taken. The saddle rod lock 232 is then tightened down against the rod 225 to secure the rod within the saddle.

During measurement of a component, if the dimension of the component is different than the dimension of the standard, the end 230 of saddle rod 225 will engage probe 213 and move the probe 213 into or out of the dial indicator 205. The dial indicator 205 senses the movement of the probe and provides an indication of the dimension of the component on a display 234.

In either of the above aspects of the invention, the support tables maintain a support surface for the component over a wide range of pin separations. A portion of the table, typically the overlapped portion, supports at least a portion of the component during the measuring process. The overlapped portion is typically sufficient to support the component without additional, manual support which can lead to operator error. Accordingly, the configuration of the tables is such that even for a substantial separation of the pins, a portion of the tables overlap to facilitate supporting the component during the measuring process. Moreover, having the measuring pins mounted in opposing relation on each table allows the tables to be moved toward each other to measure relatively small inner and outer dimensions of a wide variety of components, while still maintaining a proper support for the component.

The present invention anticipates variations and additions to the disclosed embodiments. For example, a conventional run-out indicator (not shown) can be mounted along the side of the linear measuring device to measure the roundness of a component. A preferred run out indicator, for example, is manufactured by the Starrett Co., Model No. 711FS. The indicator can be slidingly mounted along the work table to permit lateral movement parallel to the movement of the saddle, and thereby check for run-out of the component at any position along the shaft.

Figure 10:
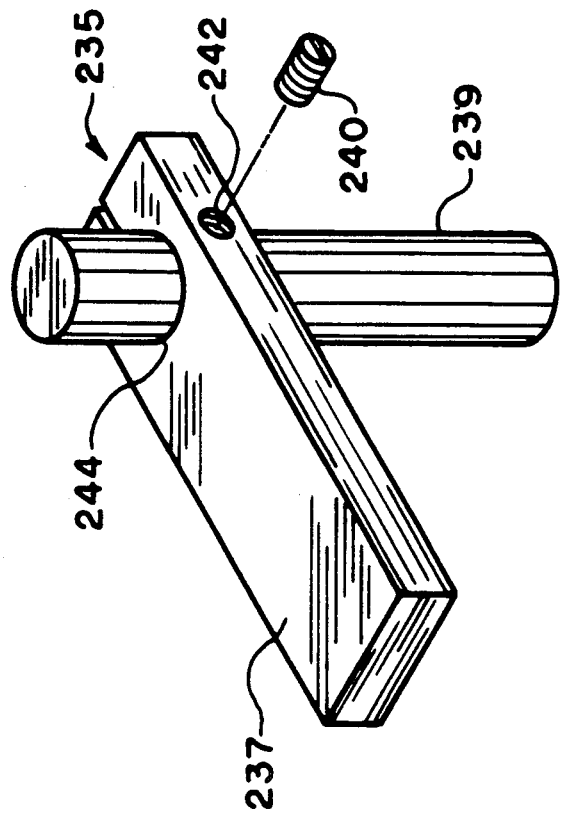
FIG. 10 is a perspective view of an adjustable support table for the linear measuring device.

Additionally, a variable support table, for example as shown generally at 235 in FIG. 10, can be used with the linear measuring device. Table 235 includes a support member 237, a support pin 239 and a set screw 240. Set screw 240 is received in a threaded bore 242 in support member 237. Bore 244 extends through support member 237 and is designed to receive support pin 239 therein. Set screw 240 can be tightened down in bore 242 against support pin 239 to secure support member 237 in a selected vertical orientation.

Support pin 239 is designed to be inserted into an aperture (not shown) formed in the worktable such that the table 235 extends above the support tables 150, 155. The variable support table 235 can be used alone or in combination with additional variable support tables to provide an extended support surface for the components during the measuring process.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the spirit of the present invention. Accordingly, the foregoing detailed description should be exemplary in nature and not as limiting to the scope and spirit of the invention set forth in the appended claims.

What is claimed is:

1. A linear measuring device for measuring a component, comprising:
a first contact member fixed to a base, a second contact member supported by and movable relative to said base, selectively detachable and attachable bias means on said second contact member adapted to provide biased engagement of said first and second contact members with a selected dimension of the component, and a linear scale mounted to and extending along said base to measure the linear displacement of said second contact member with respect to a selected reference point on said linear scale, wherein the linear displacement of said second contact member is selectively identifiable on said linear scale to initially calibrate said linear scale against a standard and provide the selected reference point.

2. A linear measuring device as in claim 1, wherein said contact members comprise measuring pins.

3. A linear measuring device as in claim 1, wherein said second contact member is a saddle, said saddle being linearly movable relative to said base.

4. A linear measuring device as in claim 3, wherein said first contact member is removably attached to said base, and said second contact member is removably attached to said saddle.

5. A linear measuring device as in claim 4, wherein said saddle is slidingly received along a shaft, said shaft being supported by and extending in spaced relation to said base.

6. A linear measuring device as in claim 1, wherein said second contact member is mounted on a saddle, said saddle including contact means cooperating with said linear scale to measure the linear displacement of said second contact member with respect to the reference point on said linear scale.

7. A linear measuring device as in claim 1, wherein the linear displacement of said second contact member is selectively identifiable on said linear scale after initial calibration to measure the linear displacement of said second contact member with respect to the selected reference point and calibrate said linear scale against a selected component to provide a second selected reference point.

8. A linear measuring device for measuring a component, comprising:

a first contact member removably attached to a base, a second contact member removably attached to a saddle, said saddle being slidingly received along a shaft and movable relative to said base, said shaft extending in spaced relation to said base and including selectively attachable and detachable spring bias means, said saddle including means for selectively attaching said saddle to said spring bias means, selectively detachable and attachable bias means on said second contact member adapted to provide biased engagement of said first and second contact members with a selected dimension of the component, and a linear scale mounted to and extending along said base to measure the linear displacement of said second contact member with respect to a selected reference point on said linear scale, wherein the linear displacement of said second contact member is selectively identifiable on said linear scale to initially calibrate said linear scale against a standard and provide the selected reference point.

9. A linear measuring device as in claim 8, wherein said spring bias means includes a rod extending co-axially with said shaft, said saddle including attachment means to selectively attach and detach said saddle to said rod.

10. A method for linearly measuring a component, comprising:

supporting a standard between or over a first contact member fixed to a base and a second contact member fixed to a saddle and linearly movable relative to said base, applying a selected bias on said second contact member to provide biased engagement of said first and second contact members with a selected dimension of the standard, calibrating a linear scale to the linear displacement of said second contact member along said scale to provide a fixed reference point on said scale, and supporting a selected component between or over said first and second contact members, applying the selected bias on said second contact member to provide biased engagement of said first and second contact members with a selected dimension of the selected component, and measuring the linear displacement of said second contact member along said linear scale with respect to the fixed reference point.

11. A method for linearly measuring a component as in claim 10, further comprising calibrating said linear scale to the linear displacement of said second contact member in engagement with said selected component to provide a second fixed reference point on said scale.

12. A method for linearly measuring a component as in claim 10, wherein the components are at least partially supported on a first support surface and a second support surface, the first contact member removably attached to and extending at an angle substantially perpendicular to the first support surface, and the second member removably attached to and extending at an angle substantially perpendicular to the second support surface.

13. A method for linearly measuring a component, comprising:

attaching a first support table to a base and removably attaching a first measuring pin at an angle perpendicular to said first support table, and attaching a second support table to a saddle linearly movable relative to said base and removably attaching a second measuring pin at an angle perpendicular to said second support table, supporting a standard between or over said first measuring pin and said second measuring pin, and applying a selected bias on said second measuring pin to provide biased engagement of said first and second contact members with a selected dimension of the standard, calibrating a linear scale to the linear displacement of said second measuring pin along said scale to provide a fixed reference point on said scale, and supporting a selected component between or over said first and second measuring pins, applying the selected bias on said second measuring pin to provide biased engagement of said first and second measuring pins with a selected dimension of the selected component, and measuring the linear displacement of said second measuring pin along said linear scale with respect to the fixed reference point.

14. A method for linearly measuring a component as in claim 13, wherein said first and second support tables each include a measuring pin support assembly, each measuring pin support assembly including a measuring pin bore designed to receive a respective measuring pin, a retaining pin bore extending into said measuring pin bore, and a retaining pin received within said measuring pin bore and adapted to be tightened down within the bore against a respective measuring pin to mount the measuring within the measuring pin bore at an angle perpendicular to the surface of a respective support table.

15. A linear measuring device for measuring a component, comprising:
- a first table fixed to a base, said first table having a first support surface,
- a first contact member mounted to said first table and projecting outwardly from said first table at an angle substantially perpendicular to said first support surface,
- a second table supported by and moveable relative to said base, said second table having a second support surface,
- a second contact member mounted to said second table and projecting outwardly from said second table at an angle perpendicular to said second support surface, said second surface extending substantially co-planar to said first surface,
- said first and second tables including selectively attachable and detachable bias means adapted to provide biased engagement of said first and second contact members with a selected dimension of the component set on said first and second support surfaces, and
- means to indicate the linear displacement between said first contact member and said second contact member.

16. A linear measuring device for measuring a component as in claim 15, wherein said linear displacement between said first contact member and said second contact member is indicated on a linear scale.

17. A linear measuring device for measuring a component as in claim 15, wherein the linear displacement between said first contact member and said second contact member is indicated on a dial indicator.

18. A linear measuring device for measuring a component as in claim 15, wherein said first and second tables each include mounting means for said first and second contact members, said mounting means including engagement means to urge and lock said contact members substantially perpendicular to said support tables.

19. A linear measuring device for measuring a component as in claim 18, wherein said engagement means includes a bore and a pin received within said bore, each of said contact members being received within a respective bore and urged and locked substantially perpendicular by a respective pin.

20. A linear measuring device for measuring a component as in claim 19, wherein each of said bores includes a wedge-shaped portion, said wedge-shaped portion being disposed substantially adjacent an opposing side of each of said tables, said pin adapted to urge a respective contact member against said wedge-shaped portion to lock a respective contact member perpendicular to said support tables.

21. A linear measuring device for measuring a component as in claim 20, wherein said wedge-shaped portion of said bores includes sidewalls, said sidewalls extending substantially perpendicular with respect to said tables.

22. A linear measuring device for measuring a component as in claim 15, wherein said first and second contact members comprise measuring pins removably mounted in said first and second tables respectively.

23. A linear measuring device for measuring a component as in claim 15, wherein said first and second tables each include a top surface, a bottom surface substantially parallel to said top surface, and sides, said tables each having a substantially semi-circular portion in top plan view.

24. A linear measuring device for measuring a component as in claim 23, wherein one of said tables includes an adjacent side surface movable relative to an adjacent side surface of the other table, each of said adjacent side surfaces including a first and second radial portion and a third portion interconnecting and substantially perpendicular to said first and second radial portions, each of said contact members mounted substantially adjacent an edge of said third portion on a respective/table.

25. A measuring device for measuring a component, comprising:
- a first table fixed to a base, said first table having a first support surface;
- a first contact member fixed to said first table and projecting outwardly from said first table at an angle substantially perpendicular to said first support surface,
- a second table supported by and moveable relative to said base, said second table having a second support surface, and being linearly movable relative to said first table,
- a second contact member fixed to said second table and projecting outwardly from said second table at an angle substantially perpendicular to said second support surface,
- said first and second tables including bias means adapted to provide biased engagement of said first and second contact members with a selected dimension of the component set on said first and second support surfaces, and
- a linear scale attached to said base to measure the linear displacement of said second contact member with respect to a selected reference point on said linear scale,
- wherein the linear displacement of said second contact member is selectively identifiable on said linear scale to calibrate said linear scale against a standard and provide the selected reference point.

* * * * *

UNITED STATES PATENT AND TRADEMARK OFFICE
CERTIFICATE OF CORRECTION

PATENT NO. : 5,167,077

DATED : December 1, 1992

INVENTOR(S) : Etchell

It is certified that error appears in the above-identified patent and that said Letters Patent is hereby corrected as shown below:

Column 16, lines 28, 29 change "respective/table" to --respective table--

Signed and Sealed this

First Day of February, 1994

Attest:

BRUCE LEHMAN

Attesting Officer Commissioner of Patents and Trademarks